(No Model.)
J. M. TEASDALE.
Churn Dasher.
No. 229,496. Patented June 29, 1880.
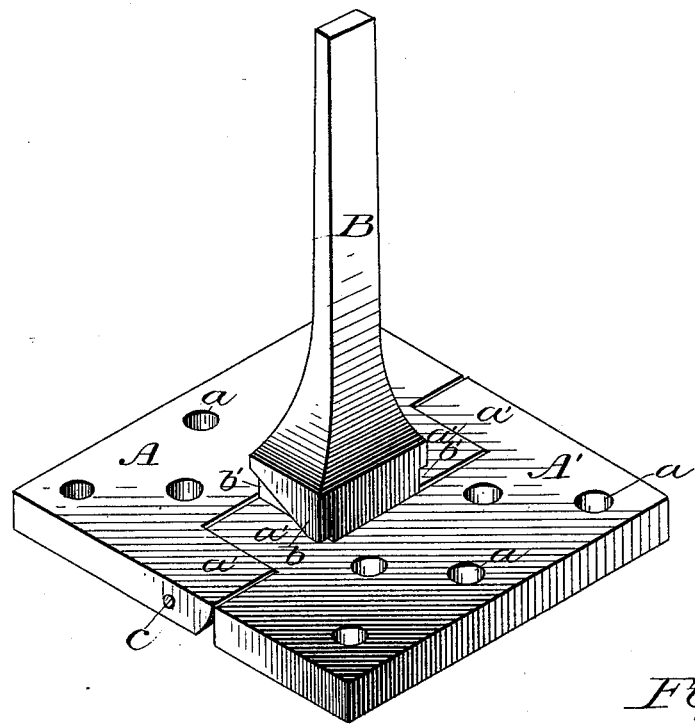
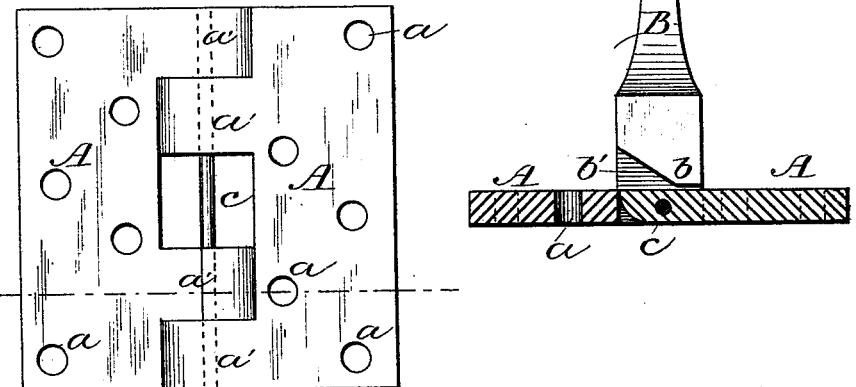
Witnesses:
Chas. E. Bishop
Richard P. Evans
Inventor:
James M. Teasdale.
by L. Deane.
Atty.
N. PETERS, PHOTO-LITHOGRAPHER, WASHINGTON, D. C.

UNITED STATES PATENT OFFICE.

JAMES M. TEASDALE, OF WYOMING, NEW YORK, ASSIGNOR OF ONE-HALF OF HIS RIGHT TO THEODORE B. KNAPP, OF HOWELL, MICHIGAN.

CHURN-DASHER.

SPECIFICATION forming part of Letters Patent No. 229,496, dated June 29, 1880.

Application filed March 5, 1880. (No model.)

*To all whom it may concern:*

Be it known that I, JAMES M. TEASDALE, of Wyoming, in the county of Wyoming and State of New York, have invented certain new and useful Improvements in Churn-Dashers, of which the following is a specification.

Figure 1 is perspective view. Fig. 2 is a plan view of the leaves of the dasher. Fig. 3 is a perspective, showing leaves in position when the dasher is being raised.

My invention relates to churn-dashers; and it consists in certain improvements therein, hereinafter more fully set forth, and pointed out in the claim.

In the accompanying drawings, A A' represent the leaves or wings of my churn-dasher, made precisely alike, and each provided with projections $a'$ $a'$, fitting into corresponding recesses in the other leaf, and having the under faces of their ends rounded, as clearly shown in Fig. 1, to allow the leaves or wings to swing freely. The leaves A A' are provided with suitable holes $a$ for the passage of the milk in the operation of churning.

B represents the handle of the dasher, rounded at its lower end, and perforated at C for the passage of the removable rod $c$, which passes also through similar perforations in the projections $a'$ on the leaves, whereby the latter are hinged to each other and to the dasher-handle B.

$b$ $b'$ represent shoulders near the lower end of the dasher-shaft, and on opposite sides thereof, the shoulders $b$ acting as stops to both leaves or wings of the dasher in its downward movement to hold the leaves in a horizontal position, and the stops $b'$, in the upward movement of the dasher, allow the leaves or wings to bend downward to an angle of about forty-five degrees.

It will be observed that in my construction the removable rod $c$ forms a hinged connection between the leaves and handle, and is the only connection for these parts employed.

The dasher thus formed is extremely cheap and simple in its construction, being composed of but three principal parts—viz., the leaves and handle hinged together by the rod $c$.

When the dasher requires cleaning it can readily be taken apart by simply removing the rod $c$, and when cleaned the parts can easily be put together and the rod inserted. No metallic hinges are employed, giving a metallic taste to the milk, and requiring the removal of screws in taking the dasher apart for cleaning.

I am aware that a churn-dasher composed of a central part, to which the handle is secured by a separate fastening, and two wings hinged to the central part, has heretofore been employed, and I therefore lay no claim to such construction.

In my invention I dispense entirely with the central part, the metallic hinges for attaching the leaves, and the fastening of the handle to the central part of the construction disclaimed, and secure by a removable rod both leaves and the handle together by a hinge-connection, and limit the up-and-down movement of the leaves in churning by stops on the handle.

Having thus fully described my invention, what I claim as new, and desire to secure by Letters Patent, is—

The combination, with the leaves A A', each having perforated projections $a'$, with rounded ends, and recesses and holes $a$, of the handle B, provided with the perforations C and stops $b$ $b'$, and the removable rod $c$, connecting together both leaves and the handle, substantially as described, and for the purpose set forth.

In testimony that I claim the foregoing as my own I affix my signature in presence of two witnesses.

JAMES M. TEASDALE.

Witnesses:
CHARLES A. CASE,
ABIJAH F. MANN.